(12) United States Patent
Komura et al.

(10) Patent No.: US 6,885,466 B1
(45) Date of Patent: Apr. 26, 2005

(54) METHOD FOR MEASURING THICKNESS OF OXIDE FILM

(75) Inventors: Atsushi Komura, Kariya (JP); Hisato Kato, Nukata-gun (JP); Hiroshi Otsuki, Okazaki (JP)

(73) Assignee: Denso Corporation, Kariya (JP)

( * ) Notice: Subject to any disclaimer, the term of this patent is extended or adjusted under 35 U.S.C. 154(b) by 421 days.

(21) Appl. No.: 09/616,372

(22) Filed: Jul. 13, 2000

(30) Foreign Application Priority Data

Jul. 16, 1999 (JP) .......................................... 11-203562

(51) Int. Cl.$^7$ .............................. G01B 11/28; G01J 4/00
(52) U.S. Cl. ...................... 356/630; 356/128; 356/364; 356/367; 356/369; 356/370; 438/14; 438/16; 438/770; 250/559.11; 250/559.19; 250/559.2; 250/559.27
(58) Field of Search ................................ 356/630, 128, 356/364, 367, 369, 370, 381, 366, 700; 438/14, 16, 630; 250/559, 559.11, 559.19, 559.2, 559.27, 252.1, 492.1, 492.2; 436/518, 525, 16, 14; 435/5

(56) References Cited

U.S. PATENT DOCUMENTS

| | | | | |
|---|---|---|---|---|
| 4,356,055 A | * | 10/1982 | Montier ................. | 156/345.25 |
| 4,606,641 A | * | 8/1986 | Yamada et al. ............. | 356/369 |
| 4,769,345 A | * | 9/1988 | Butt et al. ................ | 29/827 |
| 5,250,149 A | * | 10/1993 | Kimoto et al. .............. | 117/929 |
| 5,416,574 A | * | 5/1995 | Fantone .................... | 356/124 |
| 5,486,701 A | * | 1/1996 | Norton et al. .............. | 250/372 |
| 5,885,362 A | * | 3/1999 | Morinaga et al. ............ | 134/2 |
| 5,972,862 A | * | 10/1999 | Torii et al. ................ | 134/1.2 |
| 6,004,881 A | * | 12/1999 | Bozada et al. .............. | 438/705 |
| 6,165,916 A | * | 12/2000 | Muraoka et al. ............. | 438/790 |
| 6,168,825 B1 | * | 1/2001 | O'Brien et al. ............. | 427/160 |
| 6,221,788 B1 | * | 4/2001 | Kobayashi et al. ........... | 438/762 |
| 6,221,790 B1 | * | 4/2001 | Huang ...................... | 438/770 |
| 6,258,730 B1 | * | 7/2001 | Sun et al. .................. | 438/513 |
| 6,287,988 B1 | * | 9/2001 | Nagamine et al. ........... | 438/770 |
| 6,303,397 B1 | * | 10/2001 | Chen et al. ................ | 436/16 |
| 6,331,890 B1 | * | 12/2001 | Marumo et al. ............. | 356/364 |
| 6,362,076 B1 | * | 3/2002 | Inazuki et al. .............. | 438/458 |
| 6,379,490 B1 | * | 4/2002 | Bollinger et al. ............ | 438/14 |
| 6,519,045 B1 | * | 2/2003 | Kwon ...................... | 356/630 |
| 6,524,968 B1 | * | 2/2003 | Takahashi et al. ........... | 438/758 |
| 6,645,045 B1 | * | 11/2003 | Ohkawa .................... | 451/6 |
| 2002/0102748 A1 | * | 8/2002 | Kwon ...................... | 438/14 |
| 2002/0173084 A1 | * | 11/2002 | Ohkawa .................... | 438/149 |
| 2003/0008523 A1 | * | 1/2003 | Takahashi et al. ........... | 438/770 |
| 2004/0023513 A1 | * | 2/2004 | Aoyama et al. ............. | 438/778 |

FOREIGN PATENT DOCUMENTS

JP PCT/JP99/00229 * 7/1999 ........... G01R/27/26

OTHER PUBLICATIONS

J. A. Woollam Co., Inc., "What does an Ellipsometer measure?", http://www.jawoolla.com/tutorial–faq.html.*
"RCA Clean", http://www.mines.edu/fs_home/cwolden/chen435/clean.htm.*
"Silicon Dioxide", http://www.ece.gatech.edu/research/labs/vc/theory/oxide.html.*
Rudolph Technologies, Inc., Application Reports, http://www.rudolphtech.com/reports/tech_ellip_choice.html.*

(Continued)

Primary Examiner—John R. Lee
Assistant Examiner—Bernard E. Souw
(74) Attorney, Agent, or Firm—Posz & Bethards, PLC (57) ABSTRACT

In a process of manufacturing a semiconductor device, after a gate oxide film is formed, the thickness of the gate oxide film is measured by measuring an exposure period defined from a time at which the oxide film is formed to a time at which the thickness of the oxide film is measured. In addition, if necessary, the measurement of the oxide film is corrected to determine the real thickness based on the exposure period. Accordingly, the thickness of the gate oxide film can be measured accurately.

18 Claims, 5 Drawing Sheets

OTHER PUBLICATIONS

L. Baeunier, "Les Joints de Grains Dans Las Corrosion", Carry–Le–Rouet, France, Sep. 20–28, 1984.*

Dorlot et al., "Des Materiaux" Montreal 1980–1986.*

RUDOLF Technologies Application Reports, http://www.rudolphtech.com/reports/tech_fs.html.*

"Introduction to Statistics", course #CHM–167 given at the University of Massachusetts at Dartmouth, created Aug. 1, 1995, available at the website: http://www.umassd.edu/1Academic/CartsandSciences/Chemistry/CHM167NH/stat9.1.html.*

Salmon et al., "Oxidation behavior in air of thin alloy 601 fibres", Materials at High Temperatures 17(2), 2000, 271–278: see p. 272/col. 2, eq.2, references [4] Beaunier et al (1984) and Dorlot et al. (1986), www1.scilet.com/Papers/MAHT/17_2/Contents.pdf.*

Schell et al., FZR Report May 10, 1999, available at http://www.fz–rossendorf.de/ROBL/ExR_M_008.pdf.*

* cited by examiner

METHOD FOR MEASURING THICKNESS OF OXIDE FILM

CROSS REFERENCE TO RELATED APPLICATION

This application is based upon and claims the benefit of Japanese Patent Application No. 11-203562 filed on Jul. 16, 1999, the contents of which are incorporated herein by reference.

BACKGROUND OF THE INVENTION

1. Field of the Invention

This invention relates to a method for measuring a thickness of an oxide film formed on a substrate, which is suitably applied for evaluating a thickness of a transistor gate oxide film.

2. Description of the Related Art

Recently, a thickness of a MOS transistor gate oxide film in an LSI has been thinned to be less than 100 Å to comply with requirements for an improved integration density and an increased speed. Therefore, it has been required and examined to measure the thinned gate oxide film accurately in view of reducing a measurement error. Widely known methods for measuring a thickness of a gate oxide film are an ellipsometry utilizing a polarization analysis, a nano-spectroscopy utilizing an optical interference method, and the like ("University Course of Electricity Institute, Electronic Material Engineering", P. 228–231, written by Institute of Electricity Communicational Education, and "Applied Physics Selection, 3. Thin Film", P. 200 to 203, written by S. Kanbara and H. Fujiwara). In the ellipsometry, light is irradiated on the gate oxide film by an optical instrument to detect a refractive index and an absorption coefficient, and the thickness of the gate oxide film is measured based on the refractive index and the absorption coefficient.

SUMMARY OF THE INVENTION

However, when the thickness of the gate oxide film was measured by the conventional optical instrument, large variations beyond measurement errors of the optical instrument occurred. The large variations make measurement and control of the gate oxide film thickness inaccurate and difficult.

The present invention has been made in view of the above problem. An object of the present invention is to provide a method for measuring a thickness of an insulating film. Another object of the present invention is to control and evaluate an insulating film easily.

According to a first aspect of the present invention, a thickness of an oxide film is measured by controlling an exposure time, or period, during which the oxide film is exposed to the atmosphere from the formation of the oxide film to the measurement of the thickness. As a result, the thickness can be measured accurately. The measured thickness may be corrected in accordance with the exposure period.

According to a second aspect of the present invention, a thickness of an oxide film is measured after washing a surface of the oxide film. The washing of the oxide film removes deposits from the surface of the oxide film, resulting in accurate measurement of the thickness of the oxide film. The exposure period, during which the oxide film is exposed from the washing to the measurement of the thickness can be controlled to more precisely measure the thickness.

When the method for measuring the thickness of the oxide film according to the present invention is performed on the way of manufacturing a semiconductor device, a defective can be found out on the way of manufacture by determining whether the thickness of the oxide film falls in a desirable range or note. A succeeding step is performed when the thickness falls in the desirable range.

BRIEF DESCRIPTION OF THE DRAWINGS

Other objects and features of the present invention will become more readily apparent from a better understanding of the preferred embodiments described below with reference to the following drawings, in which.

DETAILED DESCRIPTION OF THE PREFERRED EMBODIMENTS (First Embodiment)

In a first preferred embodiment, a method for measuring an oxide film thickness according to the present invention is applied to a manufacturing process for a MOS transistor. Specifically, in a manufacture line for a product including a MOS transistor, a thickness of an oxide film formed therein is measured. If the thickness falls in a desirable range, the next step is performed. If the thickness is out of the range, the produce is removed as a defective.

Figure 1A:
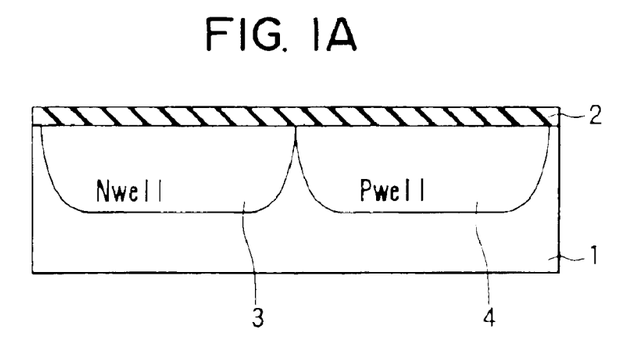
FIGS. 1A to 1C are cross-sectional views showing manufacturing steps for a MOS transistor to which a method for measuring a thickness of a gate oxide film is applied in a first preferred embodiment.

The method for measuring the thickness of the oxide film is specifically explained referring to FIGS. 1A–1C and 2A–2C below. First, as shown in FIG. 1A, a thermal oxide film 2 is formed on a silicon substrate 1, and a photolithography step and an ion implantation step are successively performed to form an N type well region 3 and a P type well region 4 in the substrate 1. For instance, phosphorous is ion-implanted at approximately $1 \times 10^{13}$ atmos/cm² to form the N type well region 3, and boron is ion-implanted at approximately $3.4 \times 10^{13}$ atmos/cm² to form the P type well region 4.

Figure 1B:
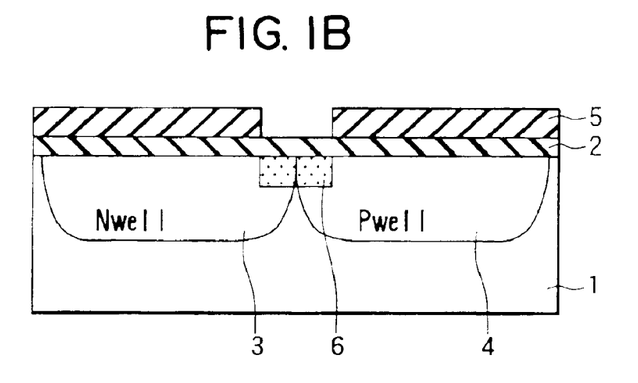

Next, after a heat treatment called as drive-in is performed at 1170° C., as shown in FIG. 1B, a nitride film ($Si_3N_4$) 5 is deposited on the silicon substrate 1 by a low pressure CVD method. After that, the nitride film 5 is patterned. After a resist is disposed and patterned by a photolithography step, boron is ion-implanted, for instance, at $7\times10^{13}$ atmos/cm$^2$ into a region where a channel stopper 6 is to be formed. Then, annealing is performed in N$_2$ atmosphere to form the channel stopper 6.

Figure 1C:
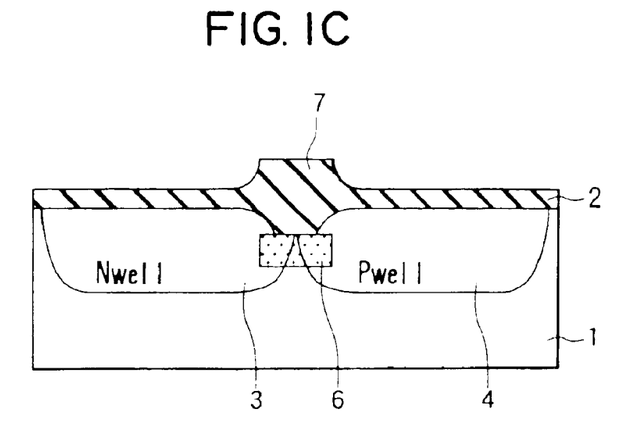
Figure 2A:
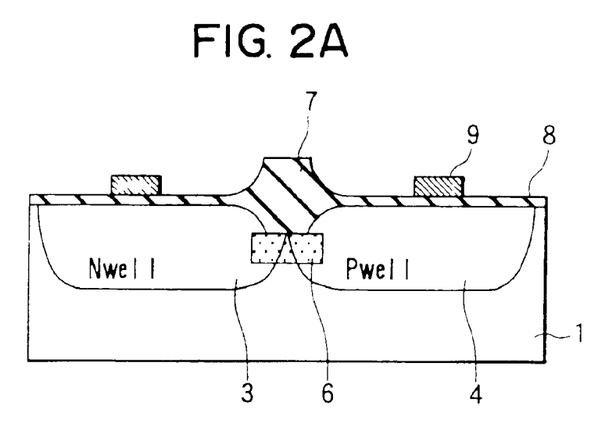
FIGS. 2A to 2C are cross-sectional views showing manufacturing steps for the MOS transistor, following the step shown in FIG. 1C.

As shown in FIG. 1C, a LOCOS oxide film 7 is formed by thermal oxidation for element isolation at a boundary portion between the N type well region 3 and the P type well region 4. The nitride film 5 and the oxide film region other than the LOCOS oxide film 7 are removed. As shown in FIG. 2A, a gate oxide film 8 is further formed by thermal oxidation. The method for measuring the thickness of the oxide film according to the present invention is applied to this gate oxide film 8.

Specifically, the thickness of the gate oxide film 8 is measured by an allipsometer utilizing a polarization analysis. That is, light is irradiated on the gate oxide film 8 and a refractive index and an absorption coefficient of the gate oxide film 8 are detected to determine the thickness of the gate oxide film 8. This measurement of the thickness is performed when a specific period of time is elapsed from the time when the gate oxide film 8 is formed.

Figure 3:
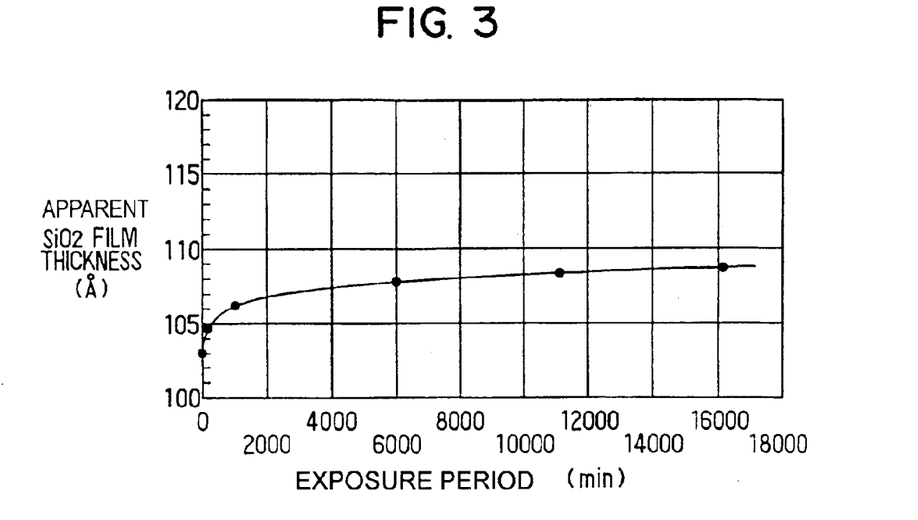
FIG. 3 is a graph showing a relation between an apparent thickness of the gate oxide film and a exposure period elapsed from the formation of the gate oxide film.

This is because it is found that the apparent thickness of the oxide film measured by an optical instrument increases gradually after the oxide film is formed on the substrate. FIG. 3 shows a relation between a change in apparent thickness of the oxide film and a exposure period from the time immediately after the oxide film is formed to the time for measuring the thickness. As shown in the figure, the apparent thickness of the oxide film changes in accordance with the exposure period after the oxide film is formed. The longer the exposure period becomes, the larger the thickness of the oxide film becomes apparently. This phenomenon is considered as follows.

As described above, the thickness of the oxide film is determined based on the refractive index and the absorption coefficient detected by light irradiated on the oxide film. That is, the thickness of the oxide film is measured based on the change in light incident on the oxide film. Therefore, if deposits exist on the surface of the oxide film to influence the refractive index and the like, the thickness of the oxide film will appear to have increased according to the measurements.

To confirm this point, the surface of the oxide film, a thickness of which was increased apparently, was washed, and then the thickness of the oxide film was measured again. As a result, the thickness of the oxide film was returned to that measured immediately after the oxide film was formed. This reveals that deposits (for instance, water and carbon in the air) attached to the surface of the oxide film can apparently increase the thickness of the oxide film.

Incidentally, after the surface of the oxide film was washed, the oxide film was exposed to the atmosphere for a specific period of time again, and the change in thickness of the oxide film was measured with respect to the new exposure period. Consequently, substantially the same experimental result as that shown in FIG. 3 was obtained. This result supports that water, carbon, and the like in the air are attached to the surface of the oxide film to apparently increase the thickness of the oxide film when the oxide film is exposed to the atmosphere.

In view of the points described above, in the present embodiment, the time for measuring the thickness of the gate oxide film 8 is controlled, and the thickness of the gate oxide film 8 is measured within a specific period of time elapsed after the gate oxide film 8 is formed. Accordingly, the thickness of the gate oxide film 8 can be measured accurately before it is increased apparently.

The shorter the period of time for measuring the thickness is, the more the thickness of the gate oxide film is measured accurately. The period of time for measurement may be determined as follows.

For instance, an allowable thickness variation with respect to latitude (specification) for process control can be calculated to determine the period of time for measurement. The thickness variation in the process is calculated by a formula of:

$$\sqrt{S^2+T^2} \leq U \tag{1}$$

where S is a variation in thickness of the gate oxide film, T is a variation in thickness of the gate oxide film according to the exposure period and U is an allowable thickness variation for the process control. The allowable variation $\delta$ is $3\sigma$ where $\sigma$ represents standard deviation, as is generally well known in statistics. The variation S is produced when the gate oxide film is formed.

The width of the variation T that fulfills the formula (1) can determine the specific period of time for measuring the thickness based on the experimental result. The width of variation may be determined using an approximate formula that is explained in a second embodiment below.

Accordingly, after the thickness of the gate oxide film is measured, the next step is carried out when the thickness falls in a desirable range. If the thickness is out of the range, the product is removed from the manufacture line. Thus, the thickness of the gate oxide film 8 can be measured accurately by controlling the period of time for the measurement such that the measurement is performed in a short time for the formation of the gate oxide film 8. By performing the measurement of the thickness in the present embodiment, defectives can be found out on the way of manufacture with high accuracy, resulting in quick feedback for process improvement and stable yield.

Figure 2B:
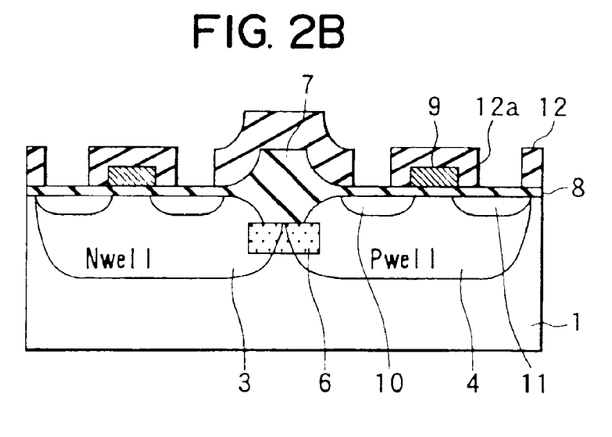
Figure 2C:
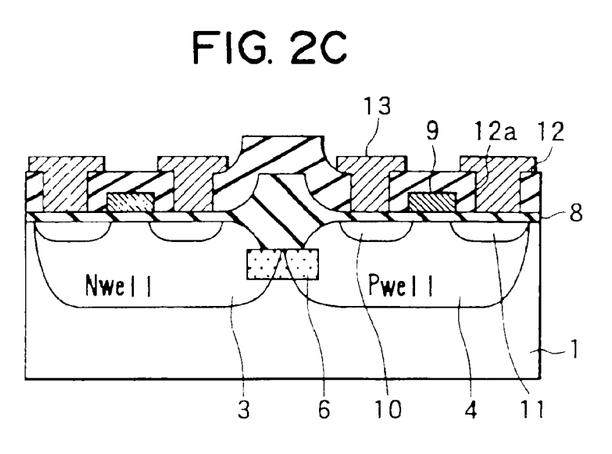

As to the product fit in the thickness, as shown in FIG. 2A, a gate electrode 9 is formed and patterned on the gate oxide film 8. Successively, as shown in FIG. 2B, after a source 10 and a drain 11 are formed at both sides of the gate electrode 9, a CVD oxide film 12 is formed on the surface of the silicon substrate 1 to cover the gate electrode 9. After a reflow treatment is performed, contact holes 12a are formed in the CVD oxide film 12. An electrical wiring pattern 13 is then disposed not only on the CVD oxide film 12 but in the contact holes 12a, and is covered by a protective film not shown. As a result, the MOS transistor is completed.

(Second Embodiment)

In a second preferred embodiment, the apparent thickness of an oxide film, which has been measured, is corrected so that an accurate thickness of the oxide film is obtained The object to which the method for measuring the thickness of the oxide film is applied in the second embodiment is substantially the same as the MOS transistor in the first embodiment. The process for finding defective products based on the measured thickness of the oxide film is also substantially the same as that in the first embodiment. Mainly, the correction of the thickness is explained below.

As described above, when the gate oxide film 8 is exposed to the atmosphere after its formation, the relation between the apparent thickness of the gate oxide film and the exposure period of time is as shown in FIG. 3. An increase in the apparent thickness of the gate oxide film is represented by an approximate formula of:

$$y = a \cdot \ln(t) + b \tag{2}$$

where t>1, and the units of y are Å.

In the formula (2), "a" and "b" are constants, and "t" is an exposure period, in minutes, elapsed from the formation of the gate oxide film 8 to the measurement of the thickness. The constant a is determined by the atmosphere (temperature, moisture) around a wafer disposed within a clean room, or the like, and was in a range of approximately 0.5 to 1.5 when it was measured in practice. The constant b is a thickness of the oxide film measured immediately after the gate oxide film 8 is formed (when t=1 min).

If the exposure period t is less than one minute, the thickness of the oxide film calculated by the formula (2) is less than the thickness of the oxide film (b in the formula) that is present immediately after the formation of the same. Therefore, the exposure period t cannot be set to be less than 1 min when the thickness is measured immediately after the gate oxide film is formed. In practice, the initial thickness of the gate oxide film 8 is measured after the wafer is taken out of an apparatus for forming the oxide film 8. Because of this, approximately 1 min or more is required to measure the initial thickness of the gate oxide film 8 from the formation of the gate oxide film 8. Therefore, the approximately formula (2) meets the practical use.

Accordingly, the apparent increase in thickness of the gate oxide film 8 is approximated by the formula (2), and calculated in accordance with the exposure period after the formation of the gate oxide film 8. The thickness of the gate oxide film can be corrected by subtracting the apparent increase in thickness from the measured apparent thickness of the gate oxide film. Thus, the exposure period is controlled after the gate oxide film 8 is formed, and the apparent thickness of the gate oxide film is corrected by the approximate formula (2). Consequently, the accurate thickness of the gate oxide can be detected.

Figure 4:
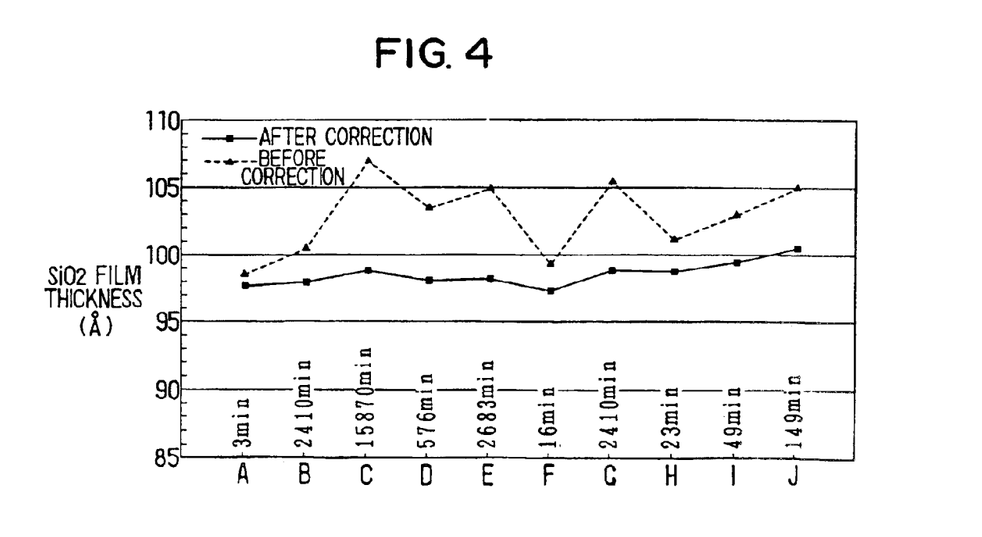
FIG. 4 is a graph showing thicknesses of the gate oxide film, corrected by an approximate formula, in a second preferred embodiment.

FIG. 4 shows variations in thickness of the gate oxide film, quantified by the approximate formula (2) for reference. The result shown in FIG. 4 was obtained by leaving plural samples (samples A–J) for various periods of time, measuring the thickness of the gate oxide film in each sample by an ellipsometer, and correcting the measured result by the formula (2). In the figure, a broken line indicates the measured apparent thicknesses, and a solid line indicates the thicknesses of the gate oxide film after correction. Each exposure period for each sample is shown above each alphabetical reference.

As shown in the figure, the measured thickness has large variations. As opposed to this, the thickness after correction has significantly decreased variations. This implies that, when the correction is not performed by the approximate formula, the measured thickness is accompanied by large variations regardless of its actual thickness falling in the desirable range. In such a case, the thickness of the gate oxide film might be determined to be out of the range erroneously. The correction of the gate oxide film thickness using the formula (2) can prevent such erroneous determination.

Figure 5:
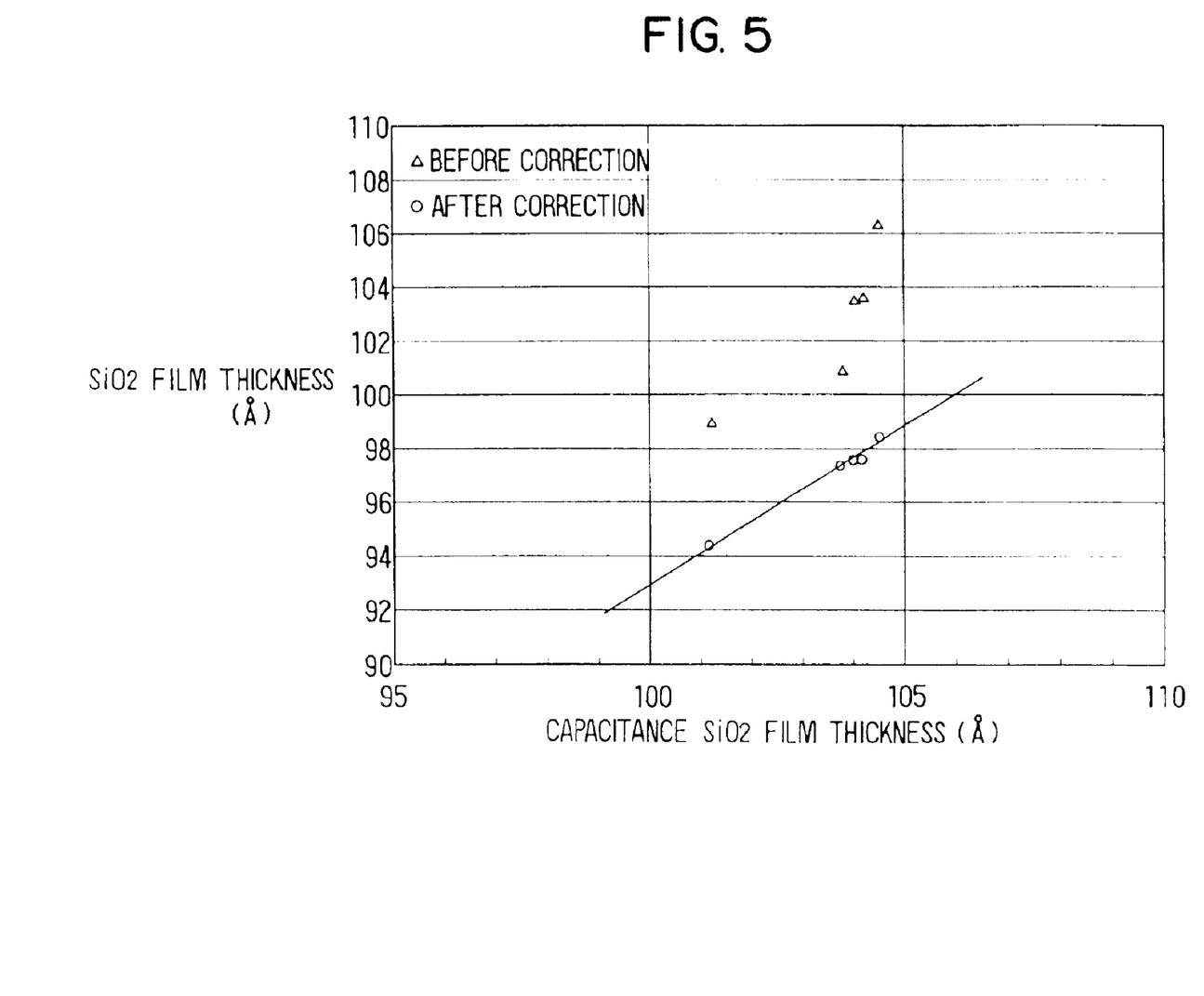
FIG. 5 is a graph showing a relation between a thickness of the gate oxide film determined by the approximated formula, and a thickness of the gate oxide film calculated based on a capacitance.

Further, reliability of the gate oxide film thickness corrected by the approximate formula was evaluated while being compared with the gate oxide film thickness that was estimated by a capacitance (capacitance produced between the gate electrode and the silicon substrate) after the product was manufactured. The comparing result is shown in FIG. 5. The thicknesses measured by the ellipsometer and not corrected, i.e., the thicknesses before correction, are also plotted in the figure for reference.

As shown in the figure, the thickness of the gate oxide film corrected by the approximate formula approximately corresponds to that obtained by the capacitance, and has a significant correlation therewith. On the other hand, the thickness of the gate oxide film before correction has no relation with that obtained by the capacitance. Thus, it is confirmed that the correction using the approximate formula can determine the thickness of the gate oxide film with high reliability and high accuracy.

(Third Embodiment)

As described above, deposits on the surface of the gate oxide film 8 can cause variations in apparent thickness of the film 8. Therefore, in a third preferred embodiment, deposits are removed from the surface of the gate oxide film 8 so that the thickness of the film 8 can be measured accurately. An object to which the present embodiment is applied is substantially the same as the MOS transistor as in the first embodiment, and the method for checking product defectives based on the measured thickness of the gate oxide film is also substantially the same as that in the first embodiment. Mainly explained below is a method for removing deposits from the surface of the gate oxide film 8.

First, the gate oxide film 8 is formed on the silicon substrate 1 by performing the steps substantially the same as those in the first embodiment. Then, immediately before the thickness of the gate oxide film is measured, the surface of the gate oxide film 8 is washed by a washing solution so that deposits are removed from the surface. Specifically, the wafer is immersed into a washing solution (mixed solution) of sulfuric acid ($H_2SO_4$) and hydrogen peroxide ($H_2O_2$), so that deposits are removed from the wafer. After that, the thickness of the gate oxide film is measured. The thickness of the gate oxide film can be measured without being affected by the deposits, resulting in accurate measurement of the thickness.

Figure 6A:
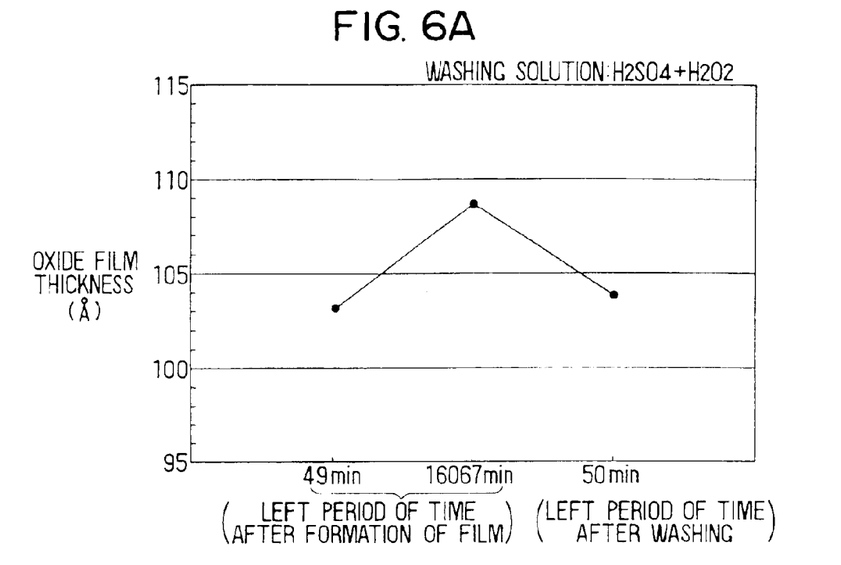
FIG. 6A is a graph showing a change in thickness of the gate oxide film before and after washing is performed using a mixed solution of sulfuric acid ($H_2SO_4$) and hydrogen peroxide ($H_2O_2$) in a third preferred embodiment.

FIG. 6A shows thicknesses of the gate oxide film measured before and after the removal of deposits. Specifically, the thickness of the gate oxide film was measured after 49 min and 15067 min were respectively elapsed from the formation of the gate oxide film 8, and after 50 min was elapsed from the washing using the mixed solution of $H_2SO_4$ and $H_2O_2$. The results are shown in FIG. 6A.

As shown in the figure, the gate oxide film, which is exposed to the atmosphere for a long period of time after its formation, has an apparently increased thickness, as compared to that immediately after the gate oxide film is formed (when exposure period is 49 min). As opposed to this, the washing using the mixed solution of $H_2SO_2$ and $H_2O_2$ can return the measured thickness of the gate oxide film 8 to approximately its initial value at which the oxide film 8 was not exposed for a long period of time. The experimental results also reveal that the thickness of the gate oxide film 8 can be measured accurately by removing deposits from the surface of the gate oxide film 8 immediately before the thickness is measured.

Incidentally, after the wafer was left for a specific period of time after the washing step was performed, the thickness of the gate oxide film was measured again. The thickness of the gate oxide film was increased in a similar relation to that increased by being left before the washing step was performed. This result supports that the increase in the apparent thickness of the gate oxide film is caused by deposits of matters, which are contained in the air, on the surface of the gate oxide film. The deposits can change slightly a refractive index, and the like.

Thus, according to the present embodiment, the thickness of the gate oxide film can be measured accurately without being affected by deposits, by removing the deposits from the surface of the gate oxide film 8. In addition, in the present embodiment, even when the exposure period of the wafer before washing is not known, the thickness of the gate oxide film can be measured accurately by controlling the exposure period after washing.

Incidentally, as described above, since the apparent thickness of the gate oxide film is increased after washing, the thickness should be measured in a specific period of time after washing, as in the first embodiment. In the present embodiment, although deposits are removed by the washing using the mixed solution of $H_2SO_4$ and $H_2O_2$, other washing solutions such as a mixed solution of hydrochloric acid (HCl) and $H_2O_2$ (HPM solution) may be used in place of the mixed solution of $H_2SO_4$ and $H_2O_2$.

Figure 6B:
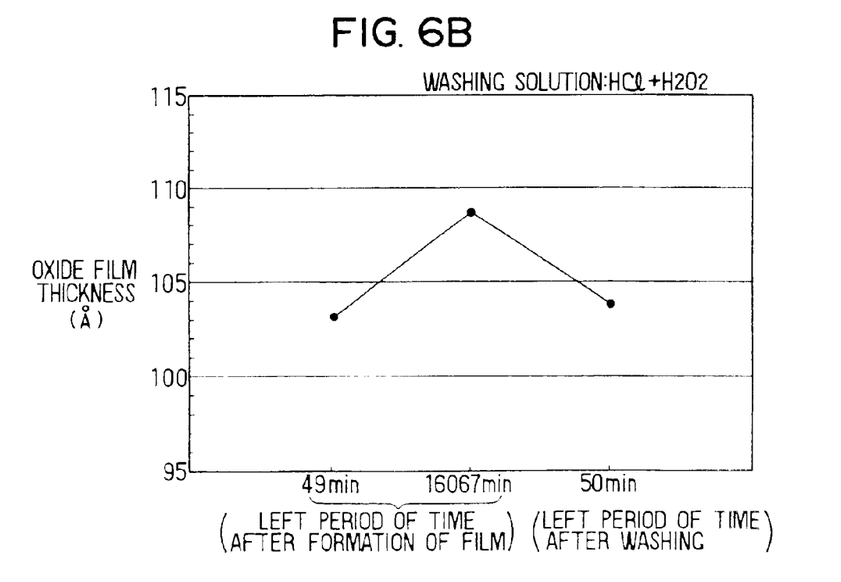
FIG. 6B is a graph showing a change in thickness of the gate oxide film before and after washing is performed using a mixed solution of hydrochloric acid (HCl) and hydrogen peroxide ($H_2O_2$) in the third embodiment.

FIG. 6B shows measurement results of gate oxide film thicknesses before and after removing deposits by the mixed solution of HCl and $H_2O_2$, similarly to those in FIG. 6A. As shown in the figure, when the mixed solution of HCl and $H_2O_2$ is used as a washing solution, the same effects as those of the mixed solution of $H_2SO_4$ and $H_2O_2$ are provided.

According to these results obtained by the washing using the mixed solution of $H_2SO_4$ and $H_2O_2$ and the washing using the mixed solution of HCl and $H_2O_2$, it is considered that water and carbon, which are contained in the air and are liable to be dissolved in or react with sulfuric acid ($H_2SO_4$) or hydrochloric acid (HCl), are attached to the surface of the gate oxide film to increase the apparent thickness of the gate oxide film. Therefore, any washing solution can be used provided that it can remove water and carbon from the surface of the oxide film.

In the embodiments described above, the gate oxide film 8 is formed through wet oxidation by a thermal CVD method. However, it is confirmed that the same effects as those in the embodiments described above were provided even when the gate oxide film was formed by other methods such as dry oxidation and plasma CVD method. The present invention can be applied to gate oxide films formed by various methods. In the second embodiment, although the apparent thickness of the gate oxide film is approximated by the formula (2), it can be approximated by other formulas (for instance, approximate formula using logarithm).

In the embodiments described above, the thickness of the gate oxide film is in a range of approximately 90 Å to 110 Å. However, the present invention is especially effective when the thickness of the gate oxide film is less than approximately 100 Å. The thinner the oxide film is, the more prominent the variation in the thickness is. Therefore, in such a case, the thickness control according to the present invention is very effective to measure the real thickness precisely. It is apparent that the present invention can be applied to a gate oxide film that is more than 100 Å in thickness as well.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A method for measuring the thickness of an oxide film, comprising:

forming an oxide film on a substrate;

measuring an exposure period from a time at which the oxide film is formed to a time at which the thickness of the oxide film is measured; and measuring the thickness of the oxide film by irradiating the oxide film with light to obtain apparent thickness; and determining an actual thickness based on the apparent thickness and the exposure period.

2. A method for measuring the thickness of an oxide film, comprising:

forming an oxide film on a substrate;

measuring an exposure period from a time at which the oxide film is formed to a time at which the thickness of the oxide film is measured; and measuring the thickness of the oxide film by irradiating the oxide film with light; and correcting the thickness measurement of the oxide film, which is measured when the exposure period is elapsed, based on a relationship between the exposure period and the thickness of the oxide film to obtain the real thickness of the oxide film.

3. The method of claim 2, wherein the method includes correcting the measurement according to the following formula:

$$y = a \cdot In(t) + b$$

in which t is the exposure period in minutes, from the formation of the oxide film to the measurement of the thickness, wherein t is at least one minute, y is the apparent thickness of the oxide film measured when the exposure period is elapsed, a is a constant determined by the atmosphere around the oxide film, and b is the real thickness of the oxide film.

4. A method for measuring a thickness of an oxide film, comprising:

forming an oxide film on a substrate;

washing a surface of the oxide film;

measuring an exposure period, which is defined from a time at which the surface of the oxide film is washed to a time at which the thickness of the oxide film is measured; and measuring the thickness of the oxide film by irradiating the oxide film with light to obtain an apparent thickness; and determining an actual thickness based on the apparent thickness and the exposure period.

5. The method of claim 4, wherein the surface of the oxide film is washed using a solution containing at least one of $H_2SO_4$ and HCl.

6. The method of claim 5, wherein the solution is one of a mixed solution of $H_2SO_4$ and $H_2O_2$ and a mixed solution of HCl and $H_2O_2$.

7. A method for measuring a thickness of an oxide film, comprising:

forming an oxide film on a substrate;

washing a surface of the oxide film;

measuring an exposure period, which is defined from a time at which the surface of the oxide film is washed to a time at which the thickness of the oxide film is measured; and measuring the thickness of the oxide film by irradiating the oxide film with light; and correcting the thickness measurement of the oxide film, which is measured when the exposure period is elapsed, based on a relationship between the exposure period and the thickness of the oxide film to obtain the real thickness of the oxide film.

8. The method of claim 7, wherein the method includes correcting the measurement according to the following formula:

$$y = a \cdot In(t) + b$$

in which t is the exposure period, in minutes, from the washing of the oxide film to the measurement of the thickness, wherein t is at least one minute, y is the apparent thickness of the oxide film measured when the exposure period is elapsed, a is a constant determined by the atmosphere around the oxide film, and b is the real thickness of the oxide film.

9. A method for manufacturing a semiconductor device, comprising:

forming an oxide film;

measuring an exposure period defined from a time at which the oxide film is formed to a time at which a thickness of the oxide film is measured; and determining the actual thickness of the oxide film by irradiating the oxide film with light based on the measured exposure time;

determining whether the thickness of the oxide film falls in a desirable range; and performing a succeeding step for manufacturing the semiconductor device when the thickness of the oxide film falls in the desirable range.

10. The method of claim 9, further comprising correcting the thickness measurement of the oxide film, which is measured when the exposure period is elapsed, based on a relationship between the exposure period and the thickness of the oxide film to obtain the real thickness of the oxide film, wherein:

the succeeding step is performed when the corrected thickness falls in the desirable range.

11. The method of claim 10, wherein the method includes correcting the measurement according to the following formula:

$$y = a \cdot ln(t) + b$$

in which t is the exposure period, in minutes, wherein t is at least one minute, y is the apparent thickness of the oxide film measured when the exposure period is elapsed, a is a constant determined by the atmosphere around the oxide film, and b is the real thickness of the oxide film.

12. A method for manufacturing a semiconductor device, comprising:

forming an oxide film;

washing a surface of the oxide film;

measuring an exposure period defined from a time at which the surface of the oxide film is washed to a time at which the thickness of the oxide film is measured; and determining the actual thickness of the oxide film by irradiating theoxide film with light based on the measured exposure time;

determining whether the thickness of the oxide film falls in a desirable range; and performing a succeeding step for manufacturing the semiconductor device when the thickness of the oxide film falls in the desirable range.

13. The method of claim 12, wherein the surface of the oxide film is washed using a solution containing at least one of $H_2SO_4$ and HCl.

14. The method of claim 13, wherein the solution is one of a mixed solution of $H_2SO_4$ and $H_2O_2$ and a mixed solution of HCl and $H_2O_2$.

15. The method of claim 12, further comprising correcting the thickness measurement of the oxide film, which is measured when the exposure period is elapsed, based on a relationship between the exposure period and the thickness of the oxide film to obtain the real thickness of the oxide film.

16. The method of claim 15, wherein the method includes correcting the measurement according to the following formula:

$$y = a \cdot ln(t) + b$$

in which t is the exposure period, in minutes, wherein t is at least one minute, y is the apparent thickness of the oxide film measured when the exposure period is elapsed, a is a constant determined by the atmosphere around the oxide film, and b is the real thickness of the oxide film.

17. The method of claim 7, wherein the surface of the oxide film is washed using a solution containing at least one of $H_2SO_4$ and HCl.

18. The method of claim 7, wherein the solution is one of a mixed solution of $H_2SO_4$ and $H_2O_2$ and a mixed solution of HCl and $H_2O_2$.

* * * * *